United States Patent [19]
Widmer

[11] 3,805,180
[45] Apr. 16, 1974

[54] BINARY-CODED SIGNAL TIMING RECOVERY CIRCUIT

[76] Inventor: Albert X. Widmer, 38 Craton Lake Rd., Katonah, N.Y. 10536

[22] Filed: Dec. 27, 1972

[21] Appl. No.: 318,971

[52] U.S. Cl. .................... 331/1 A, 331/17, 331/25, 178/66, 178/69.5
[51] Int. Cl. .................... H03b 3/04
[58] Field of Search .................... 331/1 A, 17, 18, 25

[56] References Cited

UNITED STATES PATENTS

| | | | |
|---|---|---|---|
| 3,376,517 | 4/1968 | Reynolds | 331/1 A X |
| 3,500,226 | 3/1970 | Eisenberg | 331/25 X |
| 3,602,834 | 8/1971 | McAuliffe | 331/1 A |
| 3,701,039 | 10/1972 | Lang et al. | 331/1 A |

*Primary Examiner*—Herman Karl Saalbach
*Assistant Examiner*—Siegfried H. Grimm
*Attorney, Agent, or Firm*—Sughrue, Rothwell, Mion, Zinn & Macpeak

[57] ABSTRACT

A binary-coded signal timing recovery circuit in which an input binary-coded signal is amplitude limited and then applied directly to the clock terminal of a first-edge-triggered, D-type flip-flop which is triggered by polarity transitions of the input signal immediately to set the output of the flip-flop to a maximum level having the polarity of a clock signal derived from a voltage controlled oscillator. The clock signal polarity at the time the flip-flop is triggered immediately indicates whether the input signal timing is early or late relative to the clock signal. A low pass filter averages the output of the flip-flop to provide a control voltage to the oscillator to adjust the frequency thereof and bring the clock signal into synchronism with the input signal. A second-edge-triggered, D-type flip-flop is triggered by the polarity transitions of the clock signal so that the output level of the second flip-flop has the same polarity as that of the input signal at the time the second flip-flop is triggered. The output of the second flip-flop represents the reconstructed or recovered binary-coded signal.

7 Claims, 4 Drawing Figures

BINARY-CODED SIGNAL TIMING RECOVERY CIRCUIT

BACKGROUND OF THE INVENTION

1. Field of the Invention

This invention relates to the field of circuits for recovering bit timing from binary-coded analog signals and, more particularly, to such circuits employing a phase-locked loop and a voltage controlled oscillator for recovering the bit timing.

2. Description of the Prior Art

It is broadly well known in the prior art to use a phase-locked loop including a voltage controlled oscillator for recovering bit timing from an analog signal containing binary information.

One example of a prior art timing recovery circuit of the phase-locked loop type is disclosed in U.S. Pat. No. 3,602,834, assigned to the assignee of this application. The circuit shown in this patent is of the proportional control type and requires a sample and hold circuit for the analog input signal together with a voltage controlled oscillator which must generate early and late timing pulses in addition to a clock signal. The circuit is incapable of operating directly upon the analog input signal and requires additional logic circuits for determining the correct polarities of the transitions in the analog input signal.

Another example of a proportional control type of timing recovery circuit is disclosed in U.S. Pat. No. 3,599,110, also assigned to the assignee of the present application. However, the circuit in this patent is also incapable of operating directly upon the analog input signal and requires a pair of pulse generators under the control of a voltage controlled oscillator for generating these clock and gating pulses. Furthermore, an AC coupled trigger is required for phase comparing the analog input signal and the data clock signals.

U.S. Pat. No. 3,376,517 shows a bang-bang type of phase comparator rather than a proportional control type. However, the circuit of this patent is incapable of operating directly upon an analog input signal.

U.S. Pat. No. 3,500,226 shows a conventional type of phase-locked loop wherein a phase-comparing flip-flop is set and reset each cycle by successive input and clock pulses, respectively.

SUMMARY OF THE INVENTION

The primary object of the invention is to provide an improved timing recovery circuit of the phase-locked loop type wherein bit timing is recovered directly from a raw data analog input signal by using polarity transitions of the input signal itself to gate an edge-triggered D-type flip-flop whose D input terminal receives a clock signal from a voltage controlled oscillator, thereby eliminating the requirements of the prior art for additional circuitry to determine the relative polarities of the corresponding transitions of the input analog and clock signals.

In a preferred embodiment of the invention, the analog input signal containing bit information is amplitude discriminated and squared, and the resulting signal is applied to the clock or gating input of an edge-triggered D-type flip-flop connected in a phase-locked loop with a low pass filter and a variable frequency voltage-controlled oscillator. The clock signal from the voltage controlled oscillator is applied to the D input terminal of the flip-flop. The clock signal has a nominal center frequency equal to twice the bit rate of the input signal. An input signal polarity transition gates the corresponding level of the clock signal to the output of the first flip-flop. This output level is not proportional to the phase difference between the clock signal and the input signal, but is a maximum level and of the correct polarity for adjusting the frequency of the voltage controlled oscillator in the proper direction to bring the clock signal into synchronism with the input signal. A recovered or reconstructed binary code can then be derived from the amplitude-discriminated and squared input signal by applying that signal to the D input terminal of a second edge-triggered D-type flip-flop which is triggered or gated by the polarity transitions of the clock pulses.

DESCRIPTION OF A PREFERRED EMBODIMENT

Figure 1:
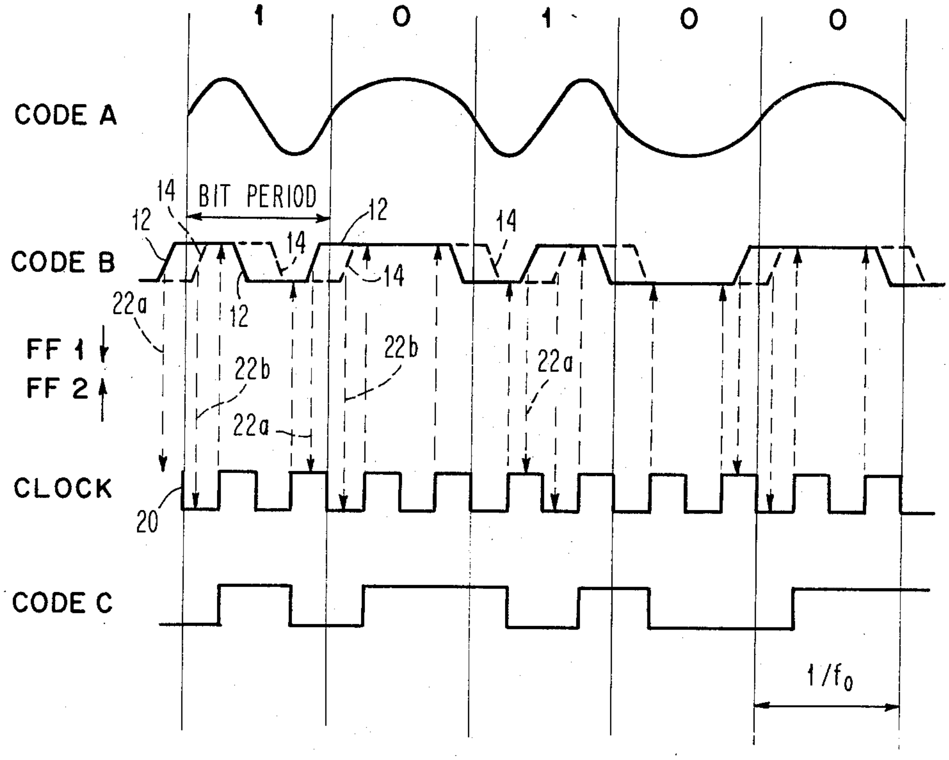
FIG. 1 is a timing diagram illustrating the essential waveforms of a preferred embodiment of the timing recovery circuit of this invention.
Figure 2:
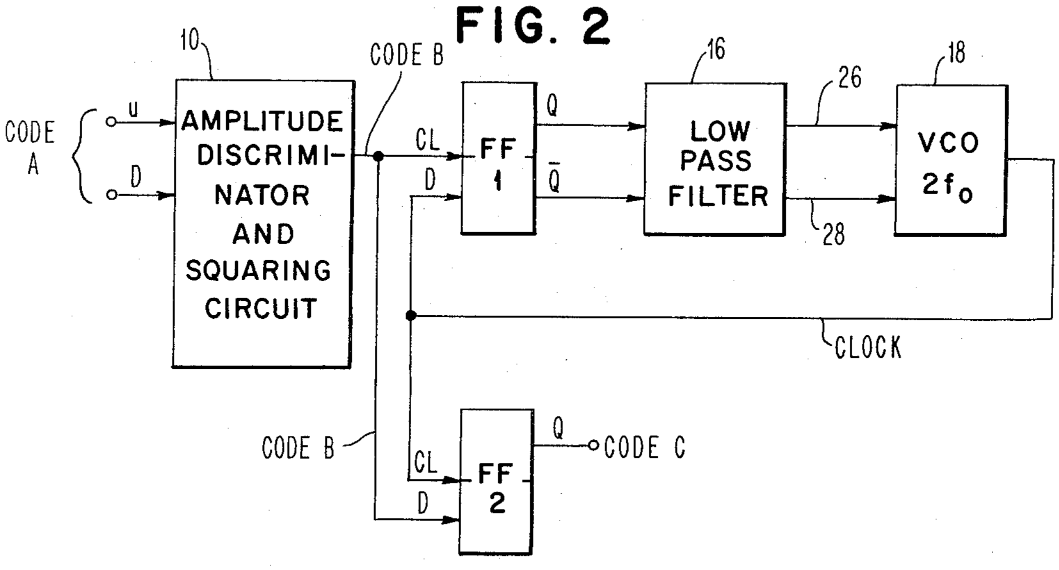
FIG. 2 is a block diagram of the circuit of the preferred embodiment of the invention.

FIG. 1 illustrates the timing and waveforms of various signals in the timing recovery circuit of the invention, and FIG. 2 is a block diagram of a preferred embodiment of the invention.

Code A is a binary-coded or PCM analog input signal having polarity transitions representing, as an example, the binary code 10100.

Code A is applied as a differential signal to the U and D input terminals of an amplitude discriminator and squaring circuit 10. Such a circuit is conventional and fucntions such that, if the U input is positive relative to the D input, the output is at the logical UP level, and vice versa. The clipped and squared waveform output from circuit 10 is illustrated in the second line of FIG. 1 as a Code B signal with uncertainty in timing. Actually, this line shows two different Code B's for the purpose of illustrating the invention. Waveform 12 illustrates a Code B corresponding to a Code A or input signal whose positive transitions precede negative transitions of the CLOCK waveform shown in the third line of FIG. 1; in other words, waveform 12 illustrates the situation in which the timing of Code A is early with respect to the CLOCK signal. By the same token, waveform 14, in dashed lines, illustrates a Code B corresponding to a Code A timing which lags the CLOCK signal.

Code B is applied to the CL or gating terminal of an edge-triggered D-type flip-flop FF1. The complementary outputs Q and $\bar{Q}$ are connected to a low pass filter 16 which in turn is connected to a voltage-controlled variable frequency oscillator (VCO) having a center frequency $2f_0$ equal to twice the frequency $f_0$ of the input analog signal or Code A. The output of VCO 18 is the CLOCK signal 20 shown in the third line of FIG. 1. This CLOCK signal is applied to the D input of flip-flop FF1.

The edge-triggered flip-flop FF1 is per se well known and operates in the following manner. A positive going transition of Code B on the CL terminal immediately raises the output Q to a maximum voltage level having a polarity identical to the polarity of the CLOCK signal simultaneously appearing on the input terminal D of flip-flop FF1. The signal on output $\overline{Q}$ of flip-flop FF1 is always the complement or opposite of the output Q. In other words, if $\overline{Q}$ is UP, then Q is DOWN, and vice versa. The output of flip-flop FF1 is not proportional to the phase difference between the Code B and CLOCK signals, but rather is immediately set at the maximum output level with the correct polarity to reduce the phase difference whenever Code B is either early or late relative to the CLOCK. The output of flip-flop FF1 then remains unchanged until at last the next positive going transition of Code B.

If Code B is in exact synchronism with the CLOCK signal 20, i.e., if positive transitions of Code B substantially coincide with negative transitions of CLOCK 20, then flip-flop FF1 will remain in each of its two states an equal amount of time and the low pass filter 16 averages these signals to produce a net zero change in the control voltage applied to VCO 18, thereby maintaining the CLOCK signal at its present frequency.

Let us now look at the case in which Code B is early with respect to the CLOCK signal as represented by waveform 12.

In FIG. 1, the downwardly pointing arrows 22*a* indicate the triggering times of flip-flop FF1. It can be seen that the positive going transitions of waveform 12 precede negative transitions of the CLOCK signal 20. In other words, every positive going transition of waveform 12 sees a positive or UP CLOCK pulse which consequently immediately places or maintains the Q output of FF1 in the UP state to cause filter 16 to produce a control voltage which increases the frequency of VCO 18 to bring the CLOCK signal 20 into synchronism with waveform 12 of Code B.

Similarly, for the lagging Code B waveform 14, each positive transition thereof follows a negative transition of CLOCK 20 and consequently each triggering of flip-flop FF1 finds on terminal D thereof a negative or DOWN CLOCK signal which brings the Q output DOWN and the $\overline{Q}$ output UP. The transitions of flip-flop FF1 caused by the positive going transitions of the Code B waveform 14 are shown by the downwardly pointing arrows 22*b*. Consequently, the outputs $\overline{Q}$ and Q produced by the lagging waveform 14 cause low pass filter 16 to apply to VCO 18 a control voltage which changes the frequency of the VCO in the opposite direction to reduce the phase difference between Code B and the CLOCK signal 20.

In this preferred embodiment of the invention, only the positive going polarity transitions of Code B are utilized and the negative going transitions are ignored; however, it would be obvious to one skilled in the art to so modify the circuit to use only the negative going transitions or to use both the positive and negative going transitions.

In FIG. 1, Code C illustrates the recovered or reconstructed binary code derived from the input Code A by using the novel timing recovery circuit of this invention. Code C may be obtained by connecting the CL or gating terminal of another edge-triggered type D flip-flop FF2 to the output of VCO 18 and connecting the input D terminal of flip-flop FF2 to the output of the circuit 10, i.e., to Code B. Note that the terminals of flip-flops FF1 and FF2 are oppositely connected with respect to the applied CLOCK Code B signals. Flip-flop FF2 effectively uses the positive going transitions of the retimed CLOCK signal 20 to gate the retimed polarity levels of Code B to the Q output of flip-flop FF2. This Q output is labeled Code C and is the reconstructed and retimed binary code 10100 contained in the original input Code A.

The circuit shown in FIG. 2 is not a proportional control type of recovery circuit as usually found in the prior art, but rather is a bang-bang type of control, i.e., flip-flop FF1 makes only the decision whether Code B is early or late with respect to the CLOCK signal 20, and the output of flip-flop FF1 is not determined by, i.e. is not proportional to, the actual phase difference between Code B and the CLOCK signal. The levels appearing on the Q and $\overline{Q}$ outputs of flip-flop FF1 are immediately switched to maximum levels of the proper polarities upon the determination of a late or early Code B, and these levels are maintained until the next sampling of the CLOCK by a positive transition of Code B of signal 20. In other words, a fixed maximum level on the outputs Q and $\overline{Q}$ is immediately applied to the low pass averaging filter 16 immediately upon the determination of a late or early code B, rather than a level which is proportional to the actual phase difference between Code B and the CLOCK signal. Furthermore, by using the positive going transitions of the input waveform A to sample the CLOCK signal 20 rather than vice versa, complex circuits for determining the proper polarity of the desired CLOCK phase adjustment, as required in the prior art, are eliminated. In other words, this improved timing recovery circuit operates directly upon the squared input analog wave and does not require pulse generators or additional timing pulses or delay circuits for assuring that the reconstructed Code C is a true reproduction of the input Code A. It can be seen that the reconstructed Code C may be interpreted as requiring two polarity transitions in a bit period to represent a binary 1, and only one polarity transition in the bit period to represent a binary O. Obviously, the invention works equally well with other coding schemes which generate similar waveforms.

Figure 3:
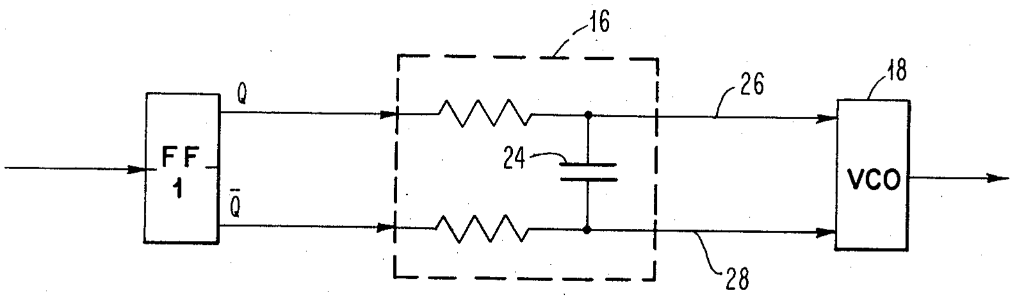
FIG. 3 is a schematic diagram of one form of low pass filter which may be used in the invention.

FIG. 3 illustrates one example of a low pass filter 16. The levels on the Q and $\overline{Q}$ outputs of flip-flop FF1 charge the capacitor 24 to apply to the control inputs 26 and 28 of VCO 18 maximum voltages of the proper polarity to bring the output CLOCK signal 20 of VCO 18 into synchronism with Code B. For example, an UP or positive voltage on control terminal 26 may increase the frequency of VCO 18, while an UP or positive voltage on control terminal 28 decreases the frequency of the VCO. The filter 16 has a primary time constant which is many times longer than the maximum interval between phase comparisons or samplings by flip-flop FF1. VCO 18 per se is well known and may be a minor modification of what is known in the television industry as the Rennick crystal VCO.

In one mode of operation of this invention, the data rate *fo* of the input Code A is 1.344 megabits per second. This invention is particularly suitable for use as a repeater in a data transmission loop operating at comparable data rates. Code A belongs to the family of bifrequency codes, but the invention is adaptable to other codes.

Figure 4:
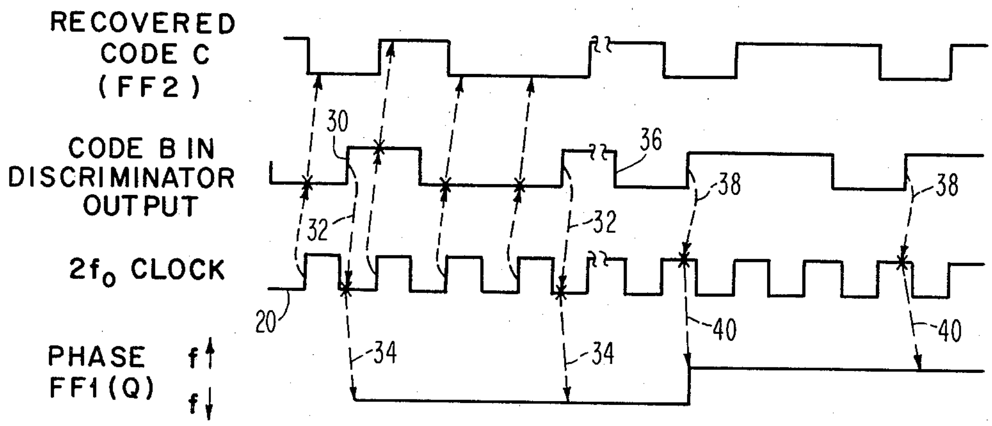
FIG. 4 is another timing diagram further illustrating the operation of the invention.

FIG. 4 is similar to FIG. 1 and shows the essential waveforms for recovering the timing in a Code B representing the binary sequence 110011. In FIG. 4, the second line shows an exemplary output of the amplitude discriminator and squaring circuit 10, i.e., Code B. The waveform portion 30 has positive transitions which follow or lag the negative transitions of the CLOCK signal 20. The last line of FIG. 4 is a waveform showing that the Q output of flip-flop FF1 is DOWN for this case. The downwardly pointing arrows 32 show the relationship between the positive going transitions of Code B and the negative polarities of the CLOCK signal 20 sampled by these positive transitions. Similarly, other downwardly pointing arrows 34 between CLOCK 20 and the waveform 30 show the corresponding level of the Q output of FF1 corresponding to these positive transitions of Code B. It can be seen that the Q output of flip-flop FF1 is DOWN so long as the positive transitions of Code B follow or lag the negative transitions of CLOCK 20.

Waveform portion 36 illustrates the case in which Code B is early relative to the CLOCK. In this case, the Q output of flip-flop FF1 is placed in its UP level since the positive transistions of Code B precede the negative transitions of the CLOCK.

Arrows 38 again indicate the points at which the CLOCK is sampled by FF1, and arrows 40 relate the output level Q of FF1 to the sampling timers. The top line of FIG. 4 shows the Q output of flip-flop FF2 which corresponds to the recovered or reconstructed Code C corresponding to the retimed original raw data or analog input signal from which Code B is derived.

While the invention has been particularly shown and described with reference to the preferred embodiment thereof, it will be understood by those skilled in the art that various changes in form and details may be made therein without departing from the spirit and scope of the invention.

I claim:

1. A timing recovery circuit for recovering the timing from an analog signal representing information symbols having polarity transitions, comprising:

a. a variable frequency oscillator for producing a clock signal;

b. phase comparator means responsive to the clock signal and directly gated by a polarity transition of said analog signal for generating a control signal representative of only the direction of a phase difference between said polarity transition and a polarity transition of the clock signal, said control signal having a polarity dependent upon the polarity of the clock signal at the time said comparator means is gated by said analog signal polarity transition; and c. means for adjusting the frequency of said oscillator with said control signal to reduce said phase difference, thereby synchronizing said clock and analog signals.

2. A timing recovery circuit as defined in claim 1 wherein said phase comparator means comprises:

a. a first edge-triggered, D-type flip-flop having a gating clock terminal and an input D terminal;

b. means for applying said analog signal to said clock terminal; and c. means for applying said clock signal to said D terminal, whereby said analog signal polarity transition gates the corresponding level of said clock signal to the output of said first flip-flop as said control signal.

3. A timing recovery circuit as defined in claim 2 further comprising a second edge-triggered, type D flip-flop responsive to said analog signal and to the polarity transitions of said clock signal to gate the corresponding levels of said analog signal to the output of said second flip-flop as a reconstructed analog signal.

4. A timing recovery circuit as defined in claim 2 wherein said oscillator is a voltage-controlled oscillator, and further comprising a low pass filter connected between the input of said oscillator and the output of said first flip-flop for averaging said control signal to produce a voltage for adjusting the frequency of said oscillator.

5. A timing recovery circuit as defined in claim 2 further comprising means connected to said clock terminal for clipping and squaring said analog signal.

6. A timing recovery circuit as defined in claim 2 wherein said analog signal comprises a symbol code of the bifrequency type in which two polarity transitions in a symbol period represent a first symbol, and one polarity transition in a symbol period represents a second symbol.

7. A timing recovery circuit as defined in claim 4 wherein the nominal center symbol rate of said oscillator is set at twice the frequency of said analog signal.

* * * * *

UNITED STATES PATENT OFFICE
CERTIFICATE OF CORRECTION

Patent No. 3,805,180 Dated April 16, 1974

Inventor(s) Albert X. Widmer

It is certified that error appears in the above-identified patent and that said Letters Patent are hereby corrected as shown below:

In The Heading:

The Assignee's name was omitted. Should be:

--International Business Machines Corporation, Armonk, New York --

Signed and sealed this 1st day of October 1974.

(SEAL)
Attest:

McCOY M. GIBSON JR.
Attesting Officer

C. MARSHALL DANN
Commissioner of Patents